C. E. FREEMAN.
SPEEDOMETER.
APPLICATION FILED JUNE 5, 1915.
1,197,281.
Patented Sept. 5, 1916.
3 SHEETS—SHEET 1.
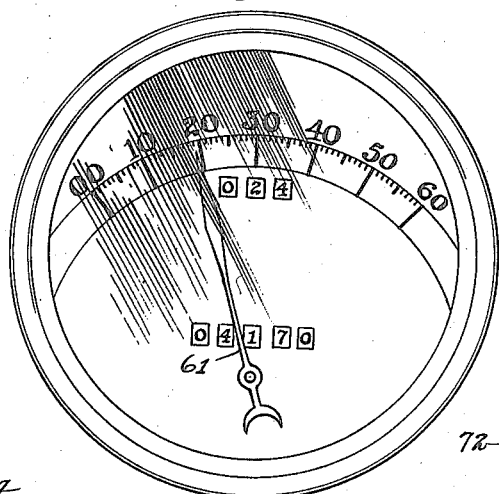
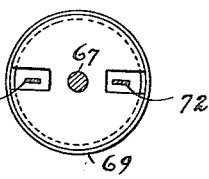
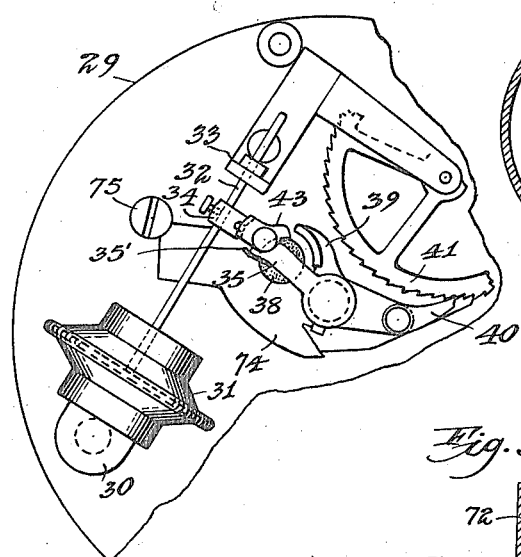
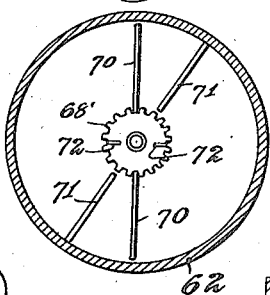
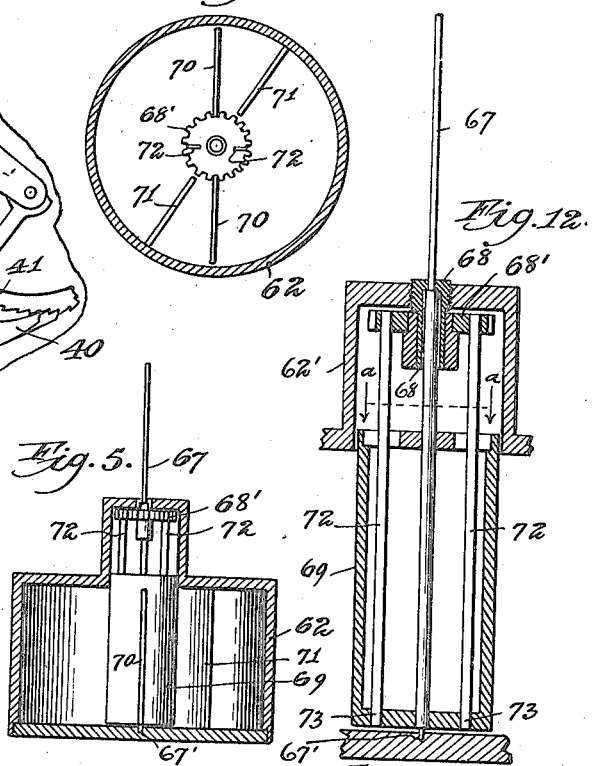
Witnesses,
Inventor,
Clarence E. Freeman
By Offield Towle Graves & Offield Attys.

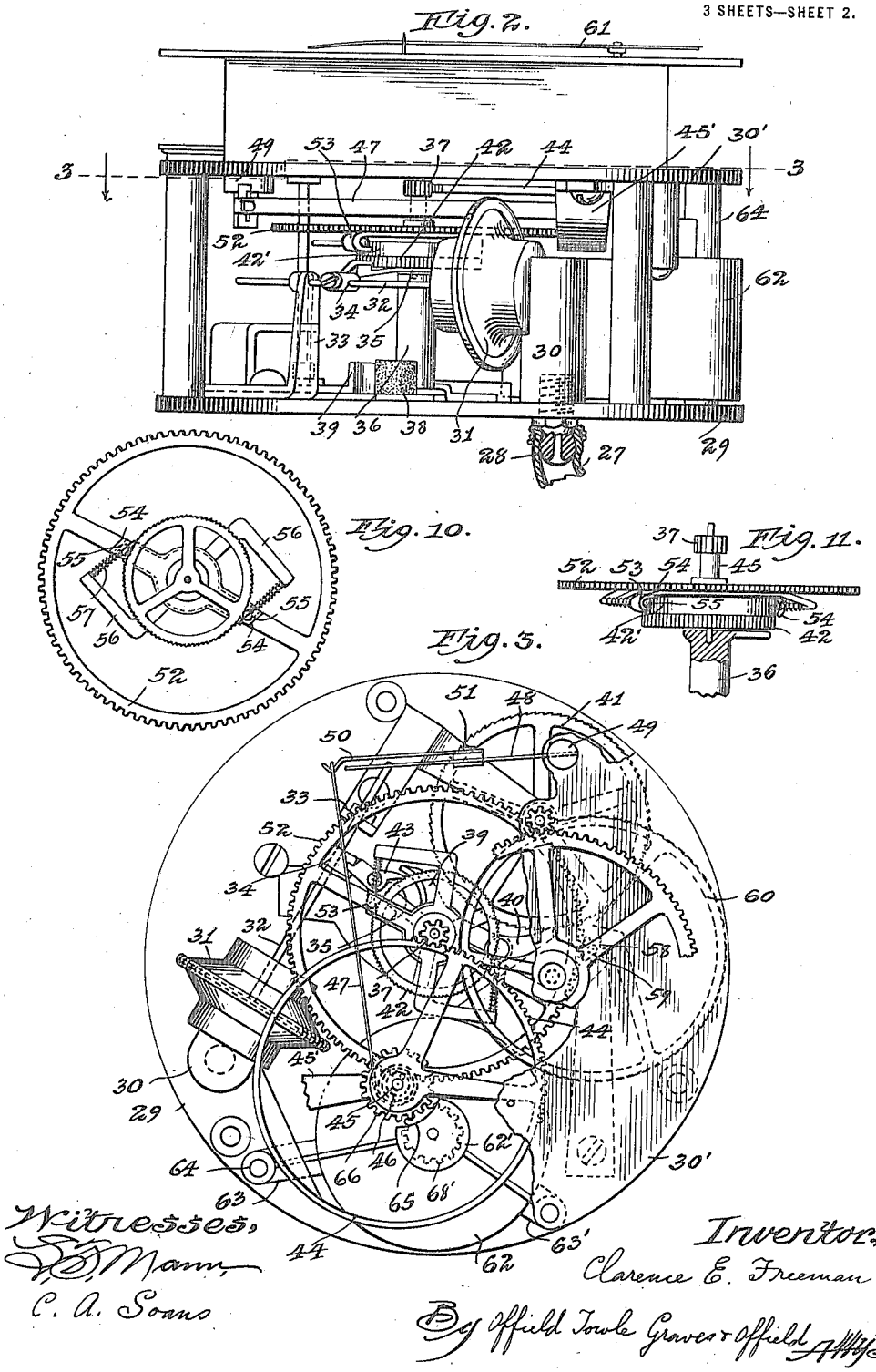

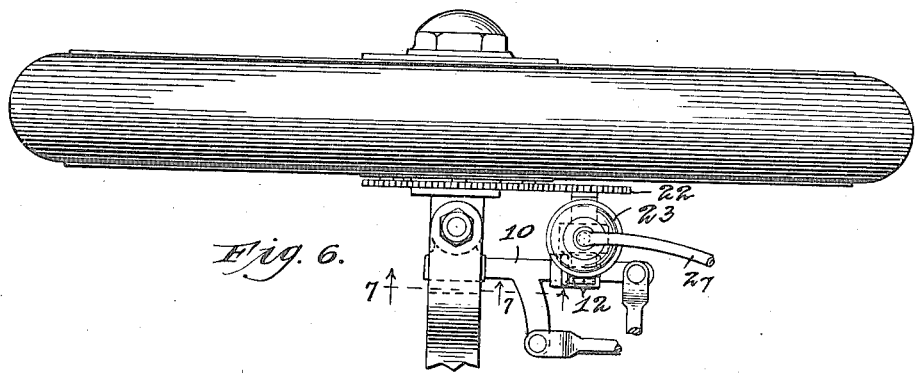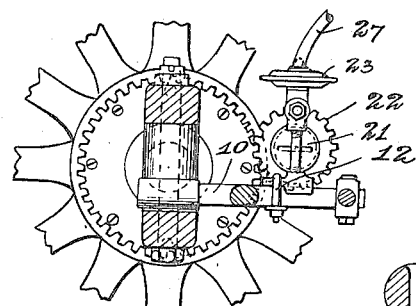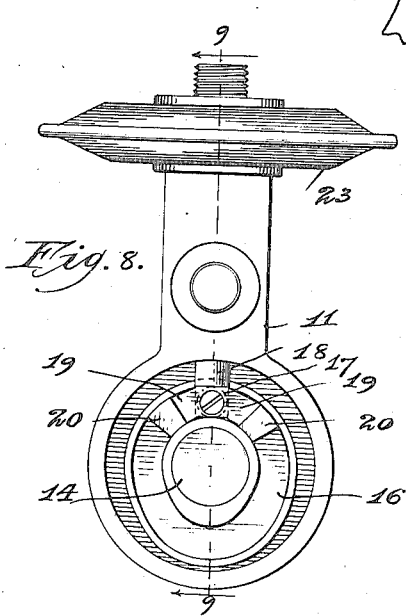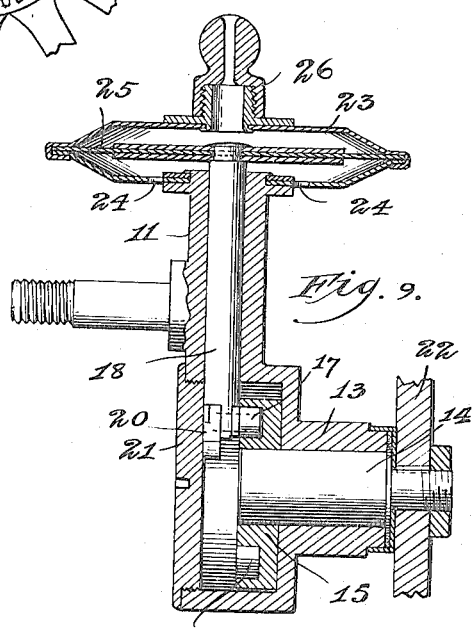

UNITED STATES PATENT OFFICE.

CLARENCE E. FREEMAN, OF CHICAGO, ILLINOIS, ASSIGNOR TO SHAFTLESS SPEEDOMETER COMPANY, OF CHICAGO, ILLINOIS, A CORPORATION OF SOUTH DAKOTA.

SPEEDOMETER.

1,197,281.  Specification of Letters Patent.  Patented Sept. 5, 1916.

Application filed June 5, 1915. Serial No. 32,264.

*To all whom it may concern:*

Be it known that I, CLARENCE E. FREEMAN, a citizen of the United States, residing at Chicago, in the county of Cook and State of Illinois, have invented certain new and useful Improvements in Speedometers, of which the following is a specification.

This invention relates to improvements in speedometers, and refers more specifically to improvements in speedometers of that type in which the indicating mechanism is driven by impulses derived from the rotation of the road wheel or other movable element whose speed is to be indicated, as distinguished from instruments of that type in which the movement is transmitted by a flexible shaft or the like. In the particular embodiment of my invention herein described the impulses are transmitted by means of a column of confined air.

Among the salient objects of my invention are to provide an instrument which is driven by impulses conveyed by means of a column of confined air substantially at atmospheric pressure, thus dispensing with the objections incident to the use of flexible shafts, electrical impulse mechanism, and other transmitting mechanisms; to provide a mechanism so organized that its accuracy is not disturbed or substantially impaired by changes in the suddenness or slowness within which the impulses are imparted, within reason; to provide a construction which is not appreciably affected by changes in temperature, atmospheric conditions and the like; to provide a construction in which notwithstanding the fact that the indicator hand is acted upon in a manner tending to move it to and fro as a result of successive impulses, it nevertheless is controlled by the steadying mechanism which practically eliminates minor vibrations of the hand; to provide a construction in which the indicator mechanism is not affected by gravity, position of the speedometer with reference to the horizontal, centrifugal force and the like; to provide an improved device of the character referred to which is simple in construction and reliable in operation, and to provide improvements in the details of construction and arrangement.

The invention consists in the matters hereinafter described, and more particularly pointed out in the claims.

In the accompanying drawings, Figure 1 is a face view of a speedometer embodying a preferred form of my invention; Fig. 2 is an edge view of the mechanism with the casing removed as viewed from the angle indicated by the arrow in Fig. 3; Fig. 3 is a sectional view taken on the line 3—3 of Fig. 2 and looking in the direction of the arrows; Figs. 4 and 5 are details of the steadying mechanism in section, as indicated by the sectional lines; Fig. 6 is a plan view of a vehicle wheel and the steering knuckle and steering arm thereof showing the impulse-transmitting mechanism mounted on said arm and geared to the wheel; Fig. 7 is a sectional view taken on line 7—7 of Fig. 6; Fig. 8 is an enlarged detail (practically full working size) of the impulse transmitting device with the screw cover of its cam chamber removed; Fig. 9 is a sectional view taken on line 9—9 of Fig. 8; Fig. 10 is a detail view of the ball ratchet mechanism shown in elevation; Fig. 11 is a plan view of the parts shown in Fig. 10 showing additionally and in section an end portion of the oscillating sleeve 36; Fig. 12 is an axial sectional view on an enlarged scale of the parts shown in Fig. 5; Fig. 13 is a sectional view on line *a*—*a* of Fig. 12, looking in the direction of the arrows. Fig. 14 is a detail of parts shown in Fig. 3.

The chief elements and the principles of operation of my improved speedometer as applied to an automobile embrace the following: Impulses from the road wheel acting upon a diaphragm vibrate the latter, and through suitable mechanism operate a pawl which steps forward a finely toothed ratchet wheel a uniform and definite distance for each vibration. This ratchet wheel is positively fixed on a shaft carrying a pinion which actuates a gear or sector, which in turn winds up or tensions a spring during the forward movement of the ratchet wheel. The spring, of course, tends constantly to unwind or restore itself and therefore to turn back the gear by which it is operated and with it the ratchet wheel by which it is stepped up. However, the unwinding movement is retarded by a fan or equivalent device which insures that a substantial interval of time must elapse after each forward step before the parts can return to zero or its initial position. Assuming the instrument as starting from zero, if the second impulse occurs in less time than is required for the spring to return the parts to zero, the second forward step will advance the gear wheel somewhat beyond the position it occupied in its first advance, and this will increase the tension of the spring. When the third impulse comes, assuming a like or shorter interval to have elapsed, the tensioning wheel will again be farther advanced, thus increasing the tension, until presently the tension of the spring will have been so increased that it will, during the interval between impulses, return the mechanism an amount equivalent to the amount it is stepped forward by a single impulse. The position thus reached will indicate the speed for a given rate of impulses.

In order that the fan retarding device, or equivalent device, may run steadily and not be reversed by the stepping forward of the main ratchet, this retarding device is geared to the main ratchet wheel through the medium of a ball or equivalent clutch in such manner that it is only the unwinding movement which drives the retarding device.

If, with a mechanism organized as described, the indicator hand were directly mounted upon or geared to the shaft of the oscillating gear, it is obvious that said hand would be constantly oscillating with that gear, and this would interfere with the accurate and convenient reading of the speed. I therefore interpose between the shaft of the oscillating gear and the axis of the indicator hand a steadying mechanism which practically eliminates the to-and-fro minor oscillations of the movement and causes the hand to move forward and back only in accordance with the main or average movement of the oscillating gear.

Describing, now, the particular mechanism which I have chosen to embody my invention, and noting that this mechanism, while constituting a preferred embodiment, is nevertheless illustrative, and referring to the drawings, upon the fixed horizontal steering arm 10 of an automobile wheel, for example, there is rigidly clamped in upright position a cam and plunger casing 11; the base part of this casing being clamped to the arm by a U-bolt 12, Fig. 7. The lower portion of the casing constitutes a journal bearing 13 for a short horizontal shaft 14, and a housing for a cam wheel 15 provided with a cam groove 16 with which engages the roller stud 17 of a plunger 18. The lower end of said plunger is also provided with a pair of wings 19, the extremities of which form bearings 20 which engage the inner face of a screw cover 21 and keep the cam stud in proper engagement with the groove and hold the plunger against axial rotation. On the outer end of the shaft 14 is mounted a spur gear 22 which meshes with another spur gear mounted rigidly upon the vehicle wheel concentrically with the axis of the latter.

On the upper end of the casing 11 is mounted a diaphragm casing 23 composed of two disks having their edges interlocked in the usual manner, the upper one of these disks being impervious but the lower one provided with vent apertures, as 24. A flexible diaphragm 25 has its periphery clamped between these disks, and with its center the upper end of the cam plunger 18 connects, as shown clearly in Fig. 9. The upper side of the diaphragm casing is also provided with a nipple 26 to which is connected a hose or pipe leading from thence to the speedometer. It will be obvious that rotation of the vehicle wheel, through the cam mechanism described, vibrates the diaphragm 25.

Referring to Fig. 2, the hose or air pipe 27, leading from the impulse producing mechanism, connects with a nipple 28, which in turn communicates through the frame plate 29 with a tube 30, and the inner end of this tube communicates with the bottom of a second diaphragm chamber 31. In this chamber is another flexible diaphragm, with the upper or outer side of which is connected a plunger rod 32, guided as to its upper end by extending through a bracket 33. On the plunger rod is adjustably mounted a yoke block 34, the forked inner end of which embraces the tail piece of a pawl pivotally mounted upon the end of an arm 35 extending radially out from, and rigid with, a rocking sleeve 36. Sleeve 36 is mounted on a stud, which has one end fixed in the frame plate 29. Its opposite end is bored to receive and support a pinion shaft which extends thence to a point of bearing in the opposed frame plate 30', and carries adjacent to the latter frame plate a pinion 37. The oscillation of sleeve 36 in one direction is limited by a cushion stop 38 fixed on the inside of frame plate 29 and coöperating with a stop arm 39 rigid with the sleeve. The movement of said sleeve in the opposite direction is determined by the limit of throw of the plunger 32, which latter is in turn controlled by the possible movement of its diaphragm in that direction. It may be mentioned incidentally that the tail end of the stop arm 39 described carries a pawl 40 which steps forward a ratchet wheel 41, and the latter through a suitable train of gears actuates an odometer mechanism, which forms no part of the present invention and need not be further described. On the shaft which extends through the sleeve 36 adjacent to the inner side of said sleeve, is loosely journaled a fine toothed ratchet wheel 42, and this wheel is actuated by a pawl 43 pivotally mounted upon the outer end of the arm 35 which is rigid with the oscillating sleeve 36. The yoke block 34 directly engages the tail piece of this pawl, as clearly shown in Fig. 3, so that the upstroke of the plunger rod 32 steps the ratchet wheel forwardly. A stop shoulder 35' on arm 35 limits the pivotal movement of pawl 43 away from ratchet wheel 41. Said ratchet wheel is rigid with the shaft which carries the pinion 37. Pinion 37 meshes with a mutilated gear 44 mounted on a suitable shaft 45 carried by the frame plate 30' and a bracket 45'. Fixed upon the same shaft 45 which carries the mutilated gear is a small drum, indicated in dotted lines at 46, Fig. 3, attached to and around which is coiled the lower end of a connecting strap 47. The upper end of this strap is connected with a composite spring, consisting of a main supporting plate 48 rigidly attached to and supported by a stud 49, and a flexible plate spring 50 having its base end mounted in a block 51 which is slidably mounted upon the member 48.

From the foregoing description it will be understood that the forward stepping of the ratchet wheel 42 tensions the spring 48—50, and the latter tends to restore the driving train to zero. To retard the return movement of this mechanism the ratchet wheel 42 is provided with a smooth cylindrical peripheral portion 42', and to coöperate therewith there is sleeved upon the same shaft which carries said ratchet wheel a relatively large spur gear 52, the spokes of which carry ball ratchet housings 53. The details of this mechanism are best shown in Fig. 10. Referring to said figure, it will be seen that upon two diametrically opposed spokes of the gear 52 there are mounted small U-shaped housings 54 which overhang the smooth peripheral portion of the ratchet wheel and inclose and confine balls 55 which engage the wheel. These housings are internally inclined toward the periphery of the wheel, so that the balls when moved in one direction engage the wheel, and when moved in the other direction frees the latter. To hold the balls in yielding ratchet engagement, two bent arms 56 are mounted on the gear, each of which carries a coiled spring 57 arranged to impinge at one end upon the corresponding ball. The periphery of the gear 52 meshes with a pinion 58 mounted on a shaft 59 which carries a retarding fan 60. The indicator hand 61 is indirectly driven from the same shaft which carries the spring winding drum but through a steadying mechanism now to be described.

Referring to Figs. 3, 4 and 5, between the lower portions of the main frame plates 29, 30', there is mounted a cylindric casing 62, shown in detail in Figs. 4 and 5. To so mount said casing it is provided with cast-on arms 63 terminating in screw sockets 64 through which screws are inserted and into the frame plate 30'. The casing 62 has an axially disposed reduced extension 62', the peripheral portion of which is cut away, as indicated at 65. This part of the casing is fixed adjacent to a gear 66 which is fast on the shaft of the spring winding drum, and is therefore rigid with the mutilated gear 44.

The indicator hand shaft 67 extends axially through the casing 62; its inner end being journaled in the back wall of said casing, as indicated at 67', its intermediate portion being journaled in the opposite end of said casing 62, and its free end carrying the indicator hand 61. Loosely sleeved on a hollow stud 68 (see sectional detail Fig. 12) surrounding the indicator hand shaft is a spur gear 68' which meshes with the gear 66 on the spring drum shaft. On the indicator hand shaft inside the casing 62 there is fixed a small drum 69 carrying a plurality of blades 70, like fan blades, and there is also fixed within the casing corresponding radial partitions 71 with which the blades 70 coöperate. The gear 68' is connected with the retarding device 69—70 by means of a plurality (two in the present instance) of slender torsion springs 72, which are connected with said gear just inside its teeth, and extend thence back through the drum 69 and are attached to the end wall of the remote end of said drum, as indicated at 73. The end of the drum 69 toward the gear 68' is either left open or provided with apertures amply large to permit the torsional movement of the springs 72 without interference.

From the foregoing description it will be seen that movement imparted to gear 68' from the gear 66 tends to oscillate the blades 70 toward and from the fixed partition 71, and inasmuch as the blades 70 fit very closely, although freely, in the cylindric periphery of the main casing 62, the retarding effect is that of an air dash-pot. Since the indicator hand is rigid with the movable member of said dash-pot, the movement of the hand corresponds to the movement of the latter.

The operation of the mechanism thus described has been quite clearly indicated in connection with the description of the parts thereof, but may be briefly stated as follows: The rotation of the vehicle wheel operates the cam mechanism and thus vibrates the diaphragm at that end of the inclosed column of air. The outward movement of the diaphragm displaces the confined air and produces a corresponding outward movement of the diaphragm at the other end of the pipe, and this in turn actuates the plunger 32 in a direction to step forward the fine ratchet wheel a definite distance. The onward rotation of the cam positively retracts the diaphragm 25 and atmospheric pressure acting upon the diaphragm at the opposite end insures the return of the plunger fully and until its return movement is arrested by the cushion stop 38 which serves to arrest the oscillating sleeve with which the plunger is connected through the arm. It is to be noted that a stop shoulder 35' carried by, and rigid with, arm 35 (see detail Fig. 14) limits the flexing movement of pawl 43 relatively to the arm which carries it, so that the cushion stop definitely limits the movement of the arm. In this connection, it may be noted that the cushion stop is carried by a plate 74, which is pivotally mounted concentric with the pivot of arm 35, and this plate may be readjusted so as to raise or lower the cushion, through movements of a clamping screw 75 threaded into the main plate 29. The advance of the ratchet wheel 42 at each step may therefore be very accurately and reliably determined. The cushion of the indicator hand from the movement of the ratchet wheel has been fully described, and need not be repeated.

From the foregoing it will be understood that the mechanism described accomplishes fully the several stated objects of the invention; that the device is operated by means of a sealed column of air, so that not only is the usual flexible shaft dispensed with but difficulty with valves is eliminated; that the accuracy of speed registration may be extremely close because those features which usually militate against accuracy have been largely eliminated, and finally, that the mechanism is comparatively simple and of reliable construction.

It will be obvious that the details of construction may be modified without departing from the spirit of the invention, and accordingly the claims are to be construed liberally, except in so far as they are specific in terms.

I claim as my invention:

1. In a speedometer, the combination of impulse-transmitting mechanism, ratchet mechanism actuated thereby, spring mechanism opposing the advancing movement of the ratchet-actuated member, a retarding mechanism governing the return movement of said ratchet-actuated mechanism, an indicator operatively associated with the ratchet-actuated mechanism, and a steadying mechanism interposed in the driving connections between the ratchet-actuated mechanism and said indicator.

2. In a speedometer, impulse transmitting mechanism, ratchet mechanism actuated thereby, a spring mechanism, a member moved to-and-fro by said ratchet mechanism and spring mechanism, respectively, retarding mechanism governing the movement of the to-and-fro member under the influence of the spring mechanism, an indicator and a steadying mechanism associated with the driving connections between said indicator and said to-and-fro member.

3. In a speedometer, impulse-transmitting mechanism, ratchet mechanism actuated thereby, an oscillating member geared to the ratchet mechanism, a spring mechanism arranged to oppose the advance movement of said oscillating member, a retarding mechanism governing the return movement of the oscillating member, an indicator and a dash-pot mechanism forming a part of a driving train between said oscillating member and said indicator.

4. In a speedometer, impulse mechanism comprising a closed column of gas, means at the member whose speed is to be measured for impressing an impulse upon said column of gas, means at the speedometer mechanism proper for converting an impressed impulse into movement of a ratchet member, a ratchet mechanism directly actuated by said impulse mechanism, an oscillating member operatively connected with said ratchet mechanism, a spring operatively connected with said oscillating member, a retarding device, an automatic one-way clutch forming a driving element between the ratchet mechanism and said retarding device, an indicator and a steadying device interposed as a driving connection between said oscillating member and said indicator.

5. In a speedometer, impulse-transmitting mechanism comprising a pipe terminating at each end in a diaphragm chamber containing a flexible diaphragm whereby a column of gas is completely confined, actuating mechanism geared to the member whose speed is to be measured for vibrating one of said diaphragms, a plunger operatively connected with the other of said diaphragms, a ratchet wheel, a pawl associated with said ratchet wheel and actuated by said plunger, a spring mechanism opposing the advance movement of the ratchet and tending constantly to return the same to initial position, a retarding device, a one-way friction clutch interposed as a driving element between said ratchet wheel and said retarding device, an indicator hand, and a dash-pot mechanism interposed as a driving element between the ratchet wheel and indicator.

6. In a speedometer, impulse-transmitting mechanism comprising a pipe terminating at each end in a diaphragm chamber containing a flexible diaphragm whereby a column of gas is completely confined, actuating mechanism geared to the member whose speed is to be measured for vibrating one of said diaphragms, a plunger operatively connected with the other of said diaphragms, a ratchet wheel, a pawl associated with said ratchet wheel and actuated by said plunger, a spring mechanism opposing the advance movement of the ratchet and tending constantly to return the same to initial position, a ball ratchet mechanism interposed as a driving element between said ratchet wheel and said retarding device, an indicator hand, and a dash-pot mechanism interposed as a driving element between the ratchet wheel and indicator.

7. In a speedometer, the combination of impulse-transmitting mechanism, ratchet mechanism actuated thereby, spring mechanism, an indicator and a steadying mechanism forming an element in the driving connections between said ratchet mechanism and indicator, said steadying mechanism comprising an air dash-pot and spring mechanism through which the driving movement is communicated to the movable element of the dash-pot.

8. In combination with a speedometer proper, impulse-transmitting mechanism for actuating the same, comprising a pipe terminating at one end in a diaphragm casing and in its opposite end in a movable member susceptible of to-and-fro movement, said diaphragm at one end and movable member at the other end of said pipe together with the pipe inclosing and confining a column of air or other gas, a cam, a plunger operatively connected with said diaphragm and also operatively associated with said cam, and means moving with the member whose speed is to be measured for actuating said cam.

9. In combination with a speedometer proper, impulse-transmitting mechanism for actuating the same comprising a casing adapted to be rigidly fixed adjacent to the moving member or element whose speed is to be measured, a cam shaft journaled in said casing, a driving element on one end of said cam shaft, a grooved cam on the other end of said shaft, a plunger inclosed in said casing and operatively engaged with the cam groove, a diaphragm casing mounted upon said casing concentrically with the plunger, a diaphragm in said diaphragm casing, operatively connected with said plunger and a pipe connected with the diaphragm chamber and extending thence to the speedometer, substantially as described.

10. In a speedometer, having an intermittently-actuated variably-moving element, from the movement of which an indicator is actuated, the combination of an indicator, operating connections between said variably-moving element and said indicator, and means for converting the variable movements of said driving element into relatively steady movements of the indicator, comprising steadying mechanism associated with the indicator driving train and governing the indicator, substantially as described.

11. In a speedometer, having an intermittently-actuated variably-moving element, from the movement of which an indicator is actuated, the combination of an indicator, operating connections between said variably-moving element and said indicator, and means for converting the variable movements of said driving element into relatively steady movements of the indicator, comprising dash-pot mechanism associated with the indicator driving train and governing the indicator.

12. In a speedometer, having an intermittently-actuated variably-moving element, from the movement of which an indicator is actuated, the combination of an indicator, operating connections between said variably-moving element and said indicator, and means for converting the variable movements of said driving element into relatively steady movements of the indicator, comprising a spring-returned air dash-pot mechanism associated with the driving train of the indicator and governing the latter.

13. In a speedometer, the combination of impulse-transmitting mechanism, ratchet mechanism actuated thereby, a rotary member adapted to be advanced in one direction by said impulse-transmitting mechanism, a spring tending to return said rotary member to its normal position, means for retarding the return movement of said rotary member to its normal position, a pointer associated with the speedometer scale, a flexible connection interposed between said rotary member and said pointer, and an air dash-pot eliminating jerky movements of said pointer.

CLARENCE E. FREEMAN.

Witnesses:
ALBERT H. GRAVES,
EMILIE ROSE.